(12) United States Patent
White

(10) Patent No.: US 12,083,639 B2
(45) Date of Patent: Sep. 10, 2024

(54) APPARATUS AND METHOD FOR MAINTAINING A GAP

(71) Applicant: Adam White, Hawthorne, CA (US)

(72) Inventor: Adam White, Hawthorne, CA (US)

(73) Assignee: Adam White, Hawthorne, CA (US)

( * ) Notice: Subject to any disclaimer, the term of this patent is extended or adjusted under 35 U.S.C. 154(b) by 141 days.

(21) Appl. No.: 17/547,220

(22) Filed: Dec. 10, 2021

(65) Prior Publication Data
US 2022/0176501 A1 Jun. 9, 2022

Related U.S. Application Data

(60) Provisional application No. 63/123,316, filed on Dec. 9, 2020.

(51) Int. Cl.
| | |
|---|---|
| *B23P 19/10* | (2006.01) |
| *A47B 77/02* | (2006.01) |
| *A47B 97/00* | (2006.01) |
| *B25B 5/00* | (2006.01) |
| *B25B 5/12* | (2006.01) |
| *B25B 5/16* | (2006.01) |

(52) U.S. Cl.
CPC .................. *B23P 19/10* (2013.01)

(58) Field of Classification Search
CPC ......... B23P 19/10; A47B 97/00; A47B 77/02; B25B 5/006; B25B 5/12; B25B 5/166
See application file for complete search history.

(56) References Cited

U.S. PATENT DOCUMENTS 5,848,711 A * 12/1998 Schmit ................... A47B 96/00
312/246
8,459,906 B1 * 6/2013 Schmitt ................. B23B 47/287
408/97

FOREIGN PATENT DOCUMENTS

TW           200824607 A  *  6/2008

* cited by examiner

*Primary Examiner* — Bayan Salone
(74) *Attorney, Agent, or Firm* — ORBIT IP, LLP

(57) ABSTRACT

A method and apparatus for maintaining a fixed distance between two cabinets during installation are provided. An elongated rail with two stops and two clamps are used. The stops are fixed to the elongated rail with opposing faces placed the fixed distance apart. The assembly is placed between the cabinets and a clamp is used to pinch a cabinet wall of each cabinet against a stop. The cabinets are installed and the apparatus is removed. In some embodiments a second apparatus may be used, one at the top of the cabinets and one at the bottom.

13 Claims, 6 Drawing Sheets

APPARATUS AND METHOD FOR MAINTAINING A GAP

CROSS-REFERENCE TO RELATED APPLICATION

This patent document claims the benefit of U.S. Provisional Application Ser. No. 63/123,316, filed on Dec. 9, 2020, the contents of which are incorporated herein by reference in their entirety and are to be considered a part of the specification.

FIELD

The present invention generally relates to products and apparatus for maintaining a spacing between two or more objects. In particular, the apparatus and methods may be used for maintaining a spacing during the installation of cabinets.

BACKGROUND

During the installation of cabinets, such as in a kitchen installation, it is often necessary to maintain a consistent and precise space between two cabinets that are being installed. For example, many appliances such as stoves and dishwashers have standard widths and cabinets need to be installed on either side of a gap with the correct width to allow the appliance to be installed later.

While it would seem that maintaining such a width would be easily accomplished by simply measuring, this is not the case. During the cabinet installation process, the cabinets are placed into position and then must be leveled. During the leveling process, the cabinets can encroach into the gap and consequently render the gap too small for the later installation of the appliance.

This effect is exacerbated by the close tolerances that may be desired. Large gaps between the appliances and the cabinets are not only unsightly, but also create unwanted crumb and dirt traps after installation is complete. Accordingly, it is very desirable to maintain any spacing between cabinets designed for an appliance as accurately as possible.

SUMMARY OF THE EMBODIMENTS

Objects of the present patent document are to provide improved methods and apparatus for maintaining a gap between cabinets during and installation. While the apparatus can be used for maintaining a gap between any two objects, its preferred use is to maintain a gap between cabinets during the installation of the cabinets, for example in a kitchen.

A method for maintaining a fixed distance between two cabinets during installation is provided. In a preferred embodiment, the method comprises adjusting a first stop along an axial length of an elongated rail. Then, fixing the first stop in a first position such that a first flat surface of the first stop is perpendicular to the axial length. Adjusting a second stop along the axial length of the elongated rail. Then, fixing the second stop in a second position such that a second flat surface of the second stop is perpendicular to the axial length and is parallel and facing an opposite direction from the first flat surface, wherein the first flat surface and the second flat surface are the fixed distance apart. Once the stops are positioned and fixed to the elongated rail, the elongated rail with the first stop and second stop is placed between the two cabinets such that the first surface interfaces with a first cabinet of the two cabinets and the second flat surface interfaces with a second cabinet of the two cabinets. Then, a first clamp is adjusted along the axial length of the elongated rail. Once the first clamp is positioned, it may be fixed in a third position adjacent the first stop such that a first wall of the first cabinet is between the first stop and the first clamp. The first clamp is tightened to squeeze the first wall between the first stop and the first clamp. Next, a second clamp is adjusted along the axial length of the elongated rail. Once the second clamp is in place, it is fixed in a fourth position adjacent the second stop such that a second wall of the second cabinet is between the second stop and the second clamp. The second clamp is tightened to squeeze the second wall between the second stop and the second clamp. Once everything is secured, the first cabinet and second cabinet can be fixed in place by screwing or gluing or some other method or any combination thereof. Finally, once the cabinets are installed and fixed in place, the first clamp and the second clamp can be loosened and the elongated rail with the first stop, second stop, first clamp and second clamp removed from between the two cabinets.

In some embodiments, the elongated rail has a channel that runs along the axial length. In some embodiments, the cross-section of the channel is dovetail shaped.

In general, the stops and clamps may be secured to the rail using many different methods. In one embodiment, the first stop, second stop, first clamp and second clamp are all fixed to the rail by tightening a fastener with a flange coupled to the fastener within the channel. In some embodiments, the flange may be a t-nut.

In preferred embodiments, the first stop and second stop each have ridges that extend into the channel. The ridges preferably fill most of the gap between the channel in order to help keep the stops perpendicular to the axial length of the rail and not allow the stops to rotate with respect to the axial length of the rial. Even more preferably, the first stop and second stop each have two ridges that extend into the channel on either side of a fastener.

In preferred embodiments, the first clamp and second clamp each have a tip that is designed to squeeze an object against a stop and is adjustable along an axial length of the first clamp and second clamp via a thread.

In some embodiments, the first clamp and second clamp each have two fasteners and two flanges that couple the first clamp and the second clamp to the elongated rail respectively.

In preferred embodiments, the elongated rail has preset positions along the axial length for the first stop and the second stop to allow the first stop and second stop to be positioned the fixed distance apart. The preset positions may be at 30 inches, 36 inches and 48 inches to name a few.

In another aspect of the embodiments taught herein, an apparatus for maintaining a fixed distance between two objects is provided. In preferred embodiments, the apparatus comprises an elongated rail with an axial length and a channel running along the axial length. A first stop releasably coupled to the elongated rail such that the first stop is adjustable along the axial length of the elongated rail and fixable in various positions along the axial length of the elongated rail. The first stop has a first flat surface that is perpendicular to the axial length when the first stop is in a first fixed position along the axial length of the elongated rail. Preferably, the first stop has a first ridge that extends into the channel. A second stop releasably coupled to the elongated rail such that the second stop is adjustable along the axial length of the elongated rail and fixable in various positions along the axial length of the elongated rail. The second stop has a second flat surface that is perpendicular to the axial length and facing in an opposite direction from the first flat surface when the first stop is in a second fixed position along the axial length of the elongated rail. Preferably, the second stop has a second ridge that extends into the channel. A first clamp that is releasably coupled to the elongated rail such that the first clamp is adjustable along the axial length of the elongated rail and fixable in various positions along the axial length of the elongated rail. The first clamp has a first tip designed to press an object against the first stop. Preferably, the first tip is adjustable along the axial length of the first clamp. A second clamp releasably coupled to the elongated rail such that the second clamp is adjustable along the axial length of the elongated rail and fixable in various positions along the axial length of the elongated rail. The second clamp has a second tip designed to press an object against the second stop. Preferably, the second tip is adjustable along the axial length of the second clamp.

DETAILED DESCRIPTION OF THE PREFERRED EMBODIMENTS

The present patent application discloses an apparatus, device or tool that maintains a fixed and precise distance between two material bodies during an installation or fabrication process. The distance is maintained by the device even during a leveling process of the material bodies or other movements that may be required for installation of the bodies.

The device maintains the precise fixed distance by clamping on to the materials and maintains the fixed dimension after clamps are engaged. The device accommodates for a range of material thickness and distances.

By utilizing rods, clamps and stops in concert with one another, the device maintains the desired fixed dimension of space between bodies. In addition to the precise spacing it maintains, the device also keeps material bodies parallel and plumb.

The device consists of a system of components that includes various rod lengths and can be packaged as a system of stops and clamps.

Components

Figure 1:
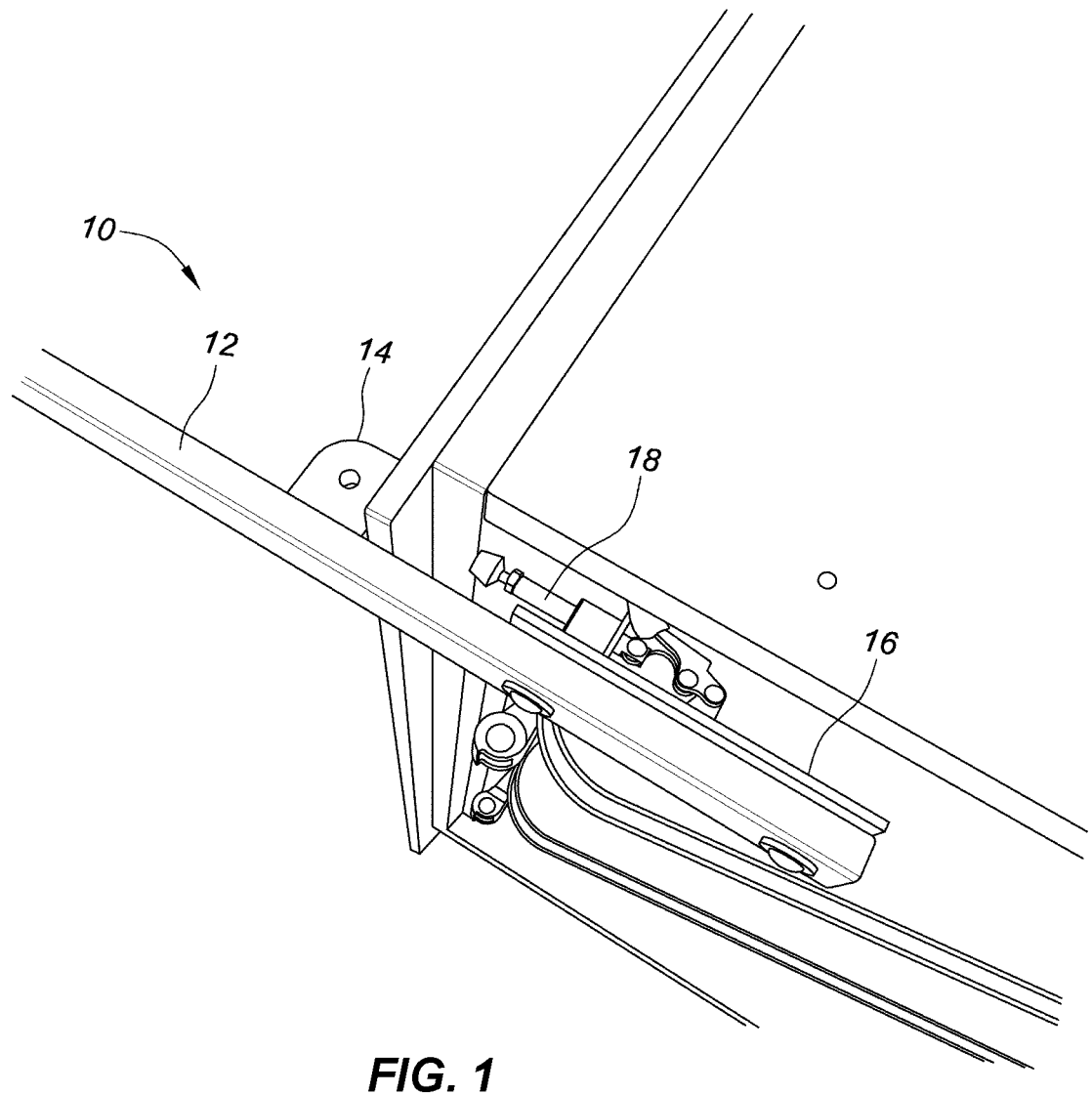
FIG. 1 illustrates an isometric view of one side of one embodiment of an apparatus for maintaining a fixed distance between two objects.

FIG. 1 illustrates an isometric view of one side of one embodiment of an apparatus for maintaining a fixed distance between two objects 10. As may be appreciated, the apparatus 10 is coupled to a cabinet in FIG. 1. In some embodiments, the apparatus 10 is coupled between to cabinets or stated another way, coupled to two cabinets, one on each end of the apparatus 10.

As may be seen in FIG. 1, the apparatus 10 includes a rail 12. The rail 12 is an elongated body with an axial length extending along its elongated body. The rail 12 can be manufactured in any length. Common lengths of gaps that need to be maintained in the cabinet industry are 30", 36", 48", and 60". The length of the rail 12 needs to be longer than the desired opening size or gap that needs to be maintained. To this end, the axial length of the rail 12 is preferably thirty inches or more. The rail 12 can be made of any ridged material such as, aluminum, wood, steel, copper, cobalt, plastic, ceramic, iron, cast iron. Preferably, the rail 12 is made from an extruded aluminum or steel.

In preferred embodiments, rail 12 has a flat surface 29 along the entire axial length. It will be understood from the teachings below, flat surface 29 is important to allow stops to be coupled to the rail 12 with surfaces perpendicular to the axial length of the rail 12. However, in other embodiments the rail 12 could be cylindrical and the stops could be coupled around the rail and fixed with a set screw or other means of securing.

Figure 2:
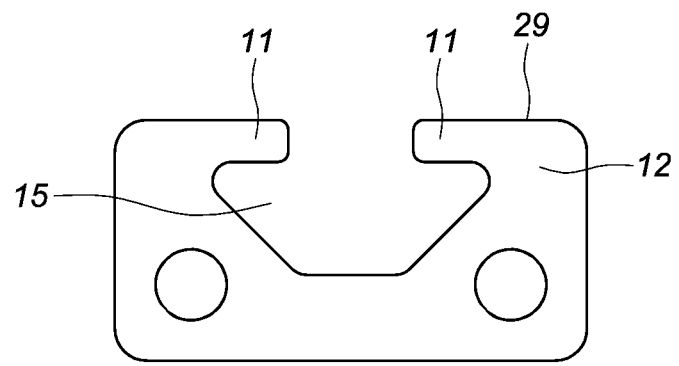
FIG. 2 illustrates a cross-sectional view of one embodiment of a rail including a dove tail shaped channel for use as part of the apparatus for maintaining a fixed distance between two objects.

FIG. 2 illustrates a cross-sectional view of a preferred rail 12 showing a dove tail type channel 15 running the entire length of the rail 12. Although not required, preferably the rail has a long channel, slot or groove 15 running the entire length. In some embodiments, the channel 15 may not run the entire length but only a portion of the length. In embodiments where the channel 15 does not run the entire length of the rail 12, the channel 15 is preferably found at each distal end of the rail 12 and absent in the middle of the rail 12.

Preferably, the channel 15 has a dove tail shape but other shapes are possible such as rectangular or U-shaped or other shapes. The key to the channel shape is that it works to help capture the components of the apparatus as they are adjusted, and preferably slidably adjusted, along the length of the rail 12. To this end, regardless of the ultimate shape of the channel 15, it preferably has lips 11 that help form a channel that can retain any slidable components. In other embodiments, the rail 12 has no channel 15 and the components may be releasably coupled to the exterior of the rail 12.

Figure 3:
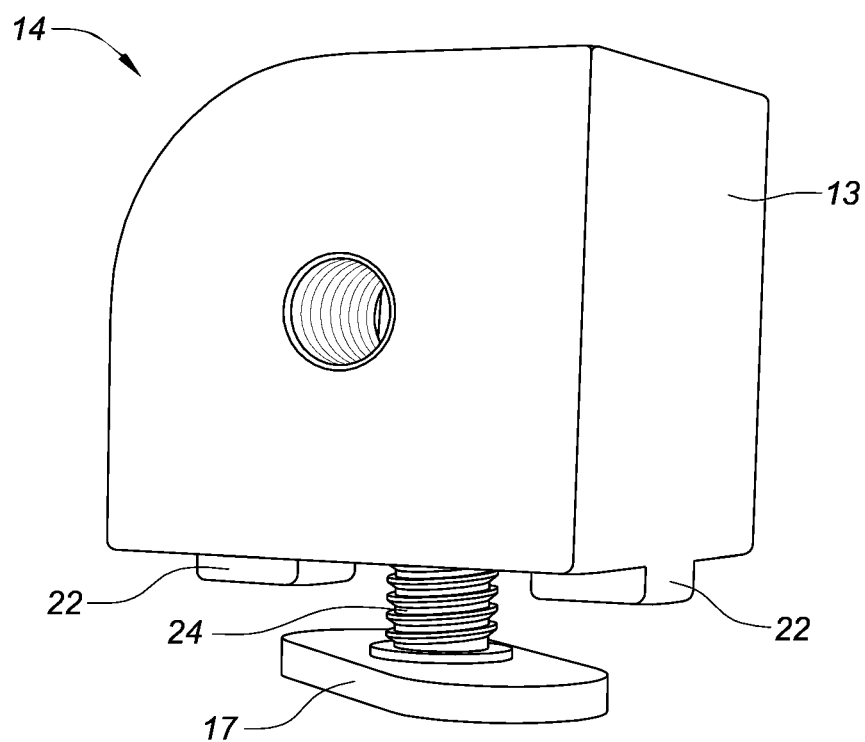
FIG. 3 illustrates an isometric view of one embodiment of a stop for use in an apparatus for maintaining a fixed distance between two objects.

FIG. 3 illustrates an isometric view of one embodiment of a stop 14 for use in an apparatus for maintaining a fixed distance between two objects. Stop 14 can be any device that may be coupled to rail 12 and be locked into a particular position at different distances along the axial length of the rail 12. In preferred embodiment, stop 14 is slidably coupled to rail 12 and more preferably, slidably coupled to the channel 15 in the rail 12. In embodiments with a channel 15, the stop is preferably captured by the channel 15. By captured it is meant that the stop 14 can be loosened and slid along the axial length of the rail 12 but it will not easily separate from the rail 12. In embodiments that don't include a slot or channel 15, the stop may be coupled to an outside surface of the rail 12. Importantly, the stop 14 needs to be coupled in a way that is lockable in different positions along the axial length of the rial 12.

In the embodiment shown in FIG. 3, the stop 14 is generally blocked shaped. However, stops 14 can be any other shape but should have at least one flat surface 13. Preferably stop 14 is made from a ridged material such as metal, preferably aluminum or steel. However, any metal may be used and plastics, ceramics and other rigid materials may also be used without departing from the scope of the embodiments. Ideally, the stop is rigid so it cannot be compressed. This is important for maintaining the exact distance between the objects desired. However, in some embodiments, a thin compressible layer of material may be added to surface 13 to protect the objects stops 14 will interface to. This thin compressible material may be rubber or a similar material. The compressible nature of this material should be within the allowable tolerances of the gap that needs to be maintained such that in operation the compression of the material does not modify the desired gap distance.

The stop is as accompanied by an adjustable fastener 24. In the embodiment shown in FIG. 3, the adjustable fastener 24 is a threaded fastener. However, in other embodiments, the adjustable fastener 24 may be a clip, spring, spring lock, slide-lock, screw or any other type of fastener that can be adjusted to releasably couple the stop 14 to the rail 12.

In some embodiments, the stop 14 may also have a capture flange 17. In the embodiment shown in FIG. 3, the capture flange 17 is a T-nut 17. However, any type of flange may be used. Preferably, the capture flange 17 is coupled to the adjustable fastener 17 such that it can be tightened and loosened with respect to the body of the stop 14. The capture flange 17 is designed to fit within the channel 15 behind lips 11. This allows the stop to be captured in the channel 15 and to the rail 12 but slidably connected to the rail 12. Stops 14 can be made from a solid block of material or L-shaped bracket. A stop 14 has a surface 13 that when the stop 14 is fixed to the rail 12, surface 13 is perpendicular to the axial length of the rail 12.

Stops 14 can be slid in either direction in the groove 15 of the rail 12 for desired placement. The apparatus 10 has two stops, one at each distal end. Both stops 14 are adjusted to the desired opening, then tightened down (secured) using a fastener 24 and capture flange 17. In the embodiment shown in FIG. 3, a threaded fastener such as a cap screw is used in combination with a T-Nut 17. The threaded fastener 24 passes through a hole in the stop 14. The flange 17 is placed under the lips 11 of the channel 15 and when the stop 14 is located the correct distance along the rail 12, the screw 24 is tightened with a tool such as an allen wrench or similar to lock the stop 14 into the desired position along the axial length of the rail 12. At this stage, surface 13 is perpendicular to the axial length of the rail 12.

In some embodiments, stop 14 has a threaded insert to allow fastener 24 to thread into the stop 14.

In addition, the surface of stop 13 that interfaces with rail 12 is perpendicular to surface 13. In some embodiments, stop 14 has a pair of ridges 22. Ridges 22 extend down from the stop 14 and are designed to extend into channel 15. Preferably, ridges 22 are located on either side of the fastener 24 on a surface perpendicular to surface 13. Ridges 22 ensure that surface 13 is perpendicular to the axial length of the rail 12 when the stop is locked into position along the rail 12.

Figure 4:
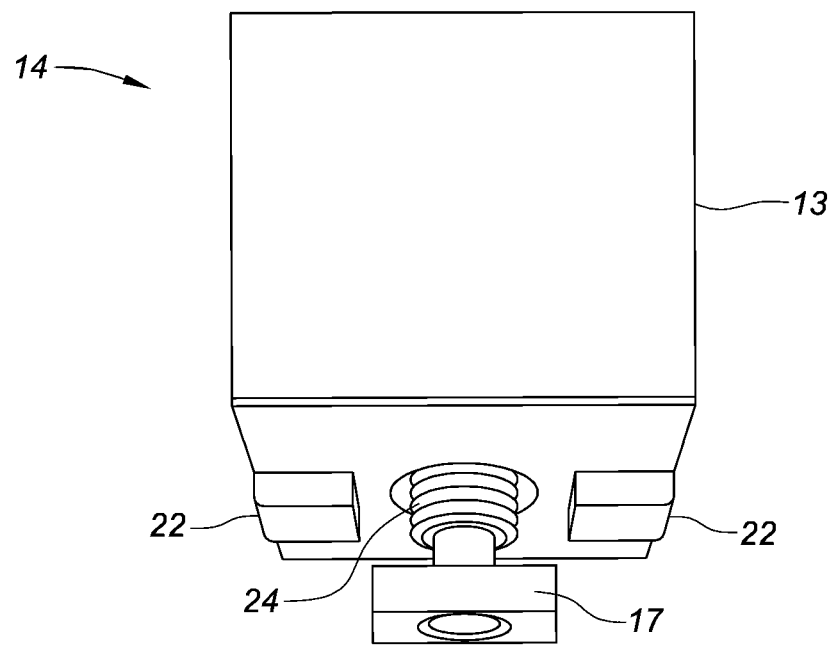
FIG. 4 illustrates an isometric view of a second embodiment of a stop for use in an apparatus for maintaining a fixed distance between two objects

FIG. 4 illustrates an isometric view of a second embodiment of a stop 14 for use in an apparatus for maintaining a fixed distance between two objects. The stop 14 in FIG. 4 is similar and works in a similar manner to the stop 14 in FIG. 3. The stop if FIG. 4 is shaped in the shape of a cube with ridges 22 protruding from the surface designed to interface with the rail 12. In FIG. 4, the capture flange 17 is a square nut.

Figure 5:
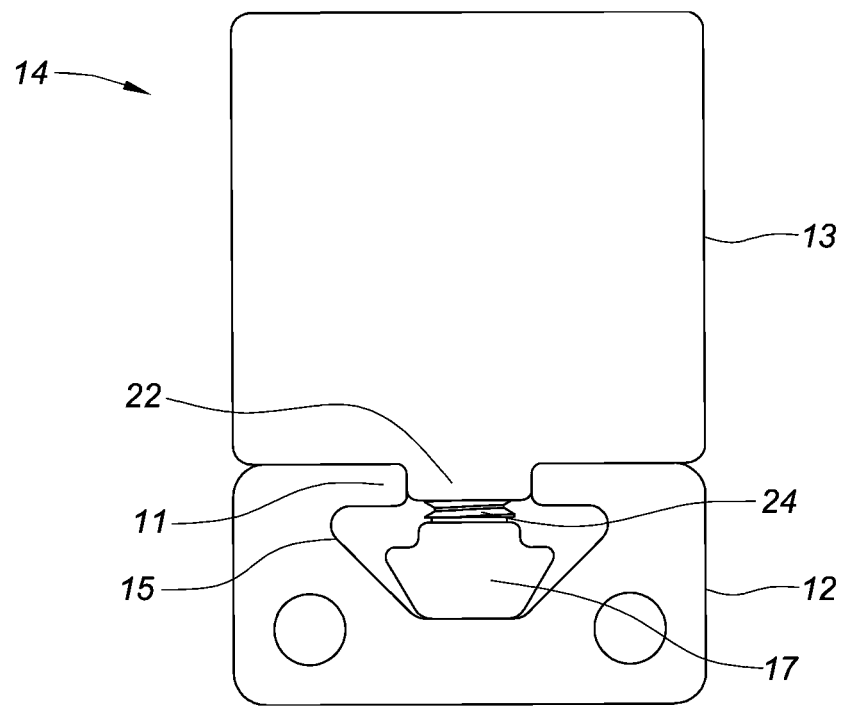
FIG. 5 illustrates a plan view of another embodiment of a stop 14 mounted to a rail 12 for use in an apparatus for maintaining a fixed distance between two objects.

FIG. 5 illustrates a plan view of another embodiment of a stop 14 mounted to a rail 12 for use in an apparatus for maintaining a fixed distance between two objects. The stop 14 in FIG. 5 is similar and works in a similar manner to the stop 14 in FIG. 4. The stop if FIG. 5, has a capture flange 17 that is shaped to fit in the dove tail channel 15. In particular, the capture flange 17 has a cross-section that allows a portion of the capture flange 17 to fit up in between lips 11 of the channel 15. Although the embodiments of stops 14 have been shown with a single fastener 24 and capture flange 17, in other embodiments the stops 14 may have two, three or more fastener/capture flange combinations.

In operation, at least two stops 14 are used and slidably coupled to the rail 12. The stops are mounted to the rail 12 with their flat surfaces 13 facing away from each other. The stops 14 are adjusted along the rail 12 until the distance between the outside edges or surfaces 13 of each stop 14 defines the gap to be maintained. The stops 14 are then secured to the rail 12 such that they cannot move with respect to each other or the rail 12. This is preferably done by tightening the fastener 24 of each stop 14.

In preferred embodiments, the rail 12 may be manufactured with preset positions for the stops at particularly common distances. To this end, there may be notches or other changes in the rail that allow the stops to easily be located such that their surfaces 13 are at exactly 30 inches apart or other commonly used distances. As just one example, the rail 12 may have small holes or dents and the stops 14 may be manufactured with a spring captured ball that seats into the holes in the rail 12 to allow predetermined spacing of the stops 14. Markings could be added to the rail 12 to allow visual confirmation of the spacing of the stops at any predetermined locations.

Figure 6:
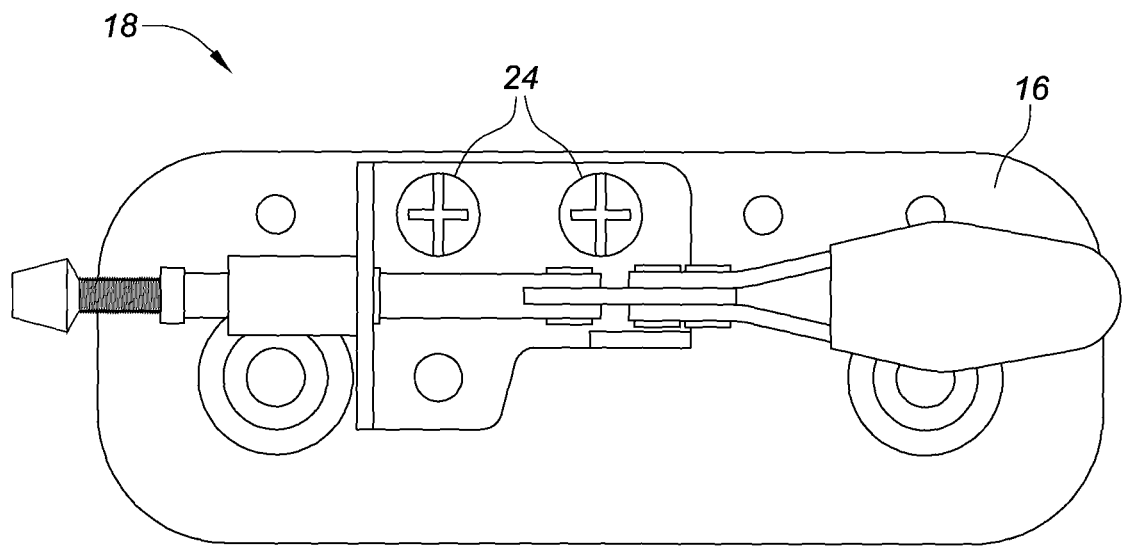
FIG. 6 illustrates one embodiment of a clamp for use in an apparatus for maintaining a fixed distance between two objects.

FIG. 6 illustrates one embodiment of a clamp for use in an apparatus for maintaining a fixed distance between two objects. In the embodiment shown in FIG. 6, the clamp includes a plate 16. Plate 16 is used to couple the clamp 18 to the rail 12 and in other embodiments other coupling methods may be used. The plate 16 is made from a ridged material and the clamping device is coupled to the plate 16 by either fasteners 24 or permanently such as in welding or construction from a single piece.

Similar to the stop 14, the clamp 18 needs to be able to be locked into particular locations along the axial length of the rail 12 and is in preferred embodiments captured to the rail and slidably coupled to the rail 12. The clamp 18 moves along the longitudinal axis of the rail 12 and may be fixed in place anywhere along the longitudinal axis of the rail 12. In preferred embodiments, the clamp 18 can slide along the rail 12 using the grove or channel 15 to couple the clamp assembly to the rail 12 just like the stop 14.

Figure 7:
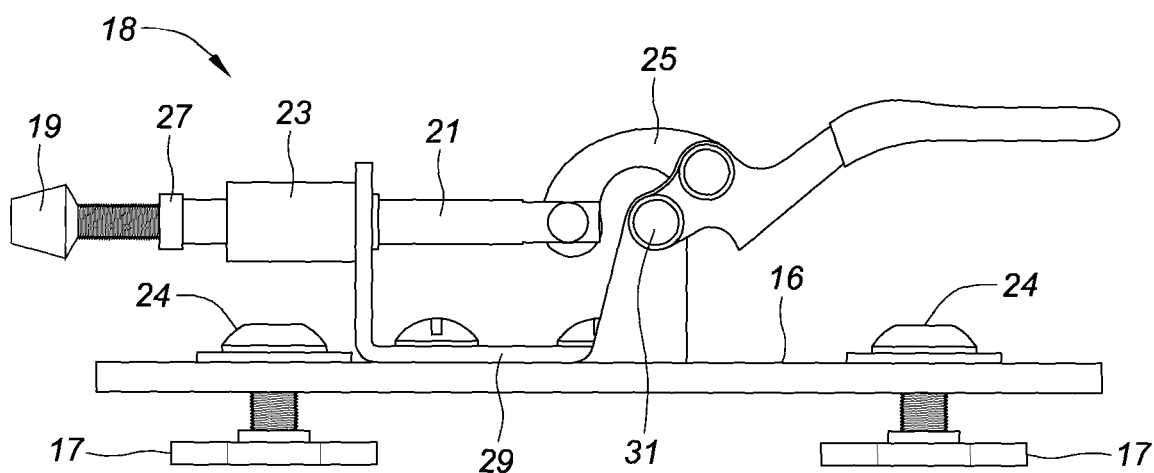
FIG. 7 illustrates a side view of the clamp of FIG. 6.

FIG. 7 illustrates a side view of the clamp 18 of FIG. 6. Clamp 18 may be designed in many different ways. In the embodiment shown in FIG. 7, the clamp 18 includes a plunger device 21 mounted parallel to the plate 16. The plunger 21 is coupled to a lever (handle) 25 at the distal end of the plunger 21. At the opposite end of the plunger 21 from the lever 25 is a tip 19.

As may be appreciated in FIG. 7, a bracket 29 is secured to the plate 16 with a fastener. The bracket 29 is an L shaped bracket with a hole that holds the plunger 21 in a parallel position to the plate 16. The bracket 29 has sleeve 23 to ensure the plunger 21 remains parallel to the plate 16.

In operation, the plunger 21 can traverse back and forth along the longitudinal length of the plate 16 by operation of the handle 25, which is attached to the distal end of the plunger 21. In the embodiment shown in FIG. 7, the plunger handle 25 is attached with a pivot 31 over a fulcrum such that when the handle 25 is pressed down, the plunger 21 is fixed in place.

In the embodiment shown in FIG. 7, the interface between the tip 19 and the plunger 21 is threaded. This allows for a fine adjustment of the tip 19 even when the clamp 18 is fixedly locked in position on the rail 12.

The distal end of the plunger 21 opposite the handle 25 has the tip. The tip may be made from a material that compresses slightly such a rubber. In preferred embodiments, the tip 19 is made from a firm rubber. However, in other embodiments it may be made from other materials. Unlike the stops which have to maintain a fixed distance, the clamps 19 just lock the apparatus 10 together such that they tip 19 does not have the same tolerance requirements for the compression of the tip discussed in relation to the stop 14. To this end, the tip 19 may be made of a softer material that compresses as long as it can hold the apparatus 10 in place on the cabinet or other object.

The plunger 21 handle 25 and tip 19 may be part of a straight line toggle clamp or other type of clamp. The clamp is coupled to the plate 16 and the plate 16 interfaces with the rail 12. As may be appreciated, there are a pair of fasteners 24 and capture flanges 17 that go through holes in the plate 16 and allow the clamp 18 to be captured to the rail 12, slidably adjusted and locked into position in the same way the stop 14 is. In particular, once in the desired location, the user can turn the screw 24 to reduce the gap between the capture flange 17 and the under side of the channel 15 to fix the clamp 18 in place. Of course, in this embodiment the clamp has a pair of fasteners/capture flanges and the stop only has one. However, in other embodiments the clamp 18 may have only one screw/capture flange or it may have more than two.

The screws 24 and capture flanges 24 pass through one or more holes in the plate 16. As discussed, this allows the clamp 18 to be slidably coupled to the rail 12 but also fixed in a single position.

Figure 8:
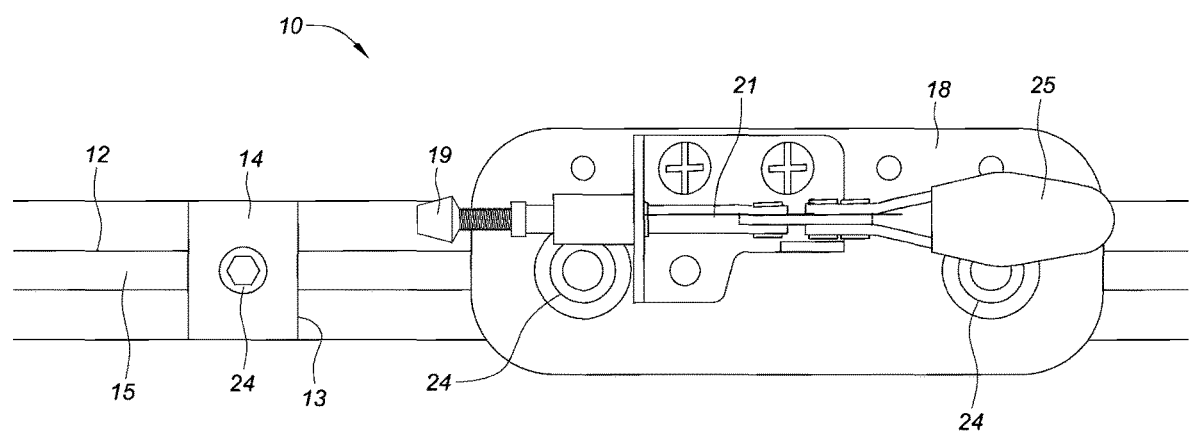
FIG. 8 illustrates an isometric view of one end of an apparatus for maintaining a fixed distance between two objects with the stop and clamp coupled to the rail.

FIG. 8 illustrates an isometric view of one end of an apparatus 10 for maintaining a fixed distance between two objects with the stop 14 and clamp 18 coupled to the rail 12. In operation, the stop 14, along with the second stop on the opposite distal end of the rail, are distanced apart such that their surfaces 13 are the exact distance of the gap that is required to be maintained between objects. Once the correct distance apart, the stops 14 are locked in place by turning fastener 24. The apparatus 10 is then slid between the objects such that each surface 13 of one of the stops 14 interfaces with one of the objects and separates them by the desired distance. The clamp 18 is then translated along the axial length of the rail 12 such that it is in position to firmly hold to the object when the handle 25 of the clamp is depressed and the tip 19 is translated along the axial length of the rail towards the stop 14. Once the clamp 18 is in position it is fixed or locked down to the rail by turning screws 24 on the clamp 18. Ideally, the same type of fasteners or at least fastener interfaces are used on all fasteners such that a single tool can be used for tightening and loosening the fasteners 24. The same steps are repeated on the opposite distal end of the apparatus with the second stop and second clamp. In preferred embodiments, more than one apparatus may also be used such that two or more apparatus are placed between objects where it is desired to maintain a fixed distance between the objects. In the preferred embodiments, two apparatus are used, one near the top of the objects and one near the bottom. In other embodiments, a single apparatus is used in the middle of the objects or at the top or bottom of the objects.

As discussed, coupling the tip 19 to the plunger 21 with threads allows fine adjustment of the position of the tip 19 with respect to the clamp 18 and, thus, the amount of force applied through the object to the stop 14 when the clamp 18 is locked down with the handle 25. The clamp 18 can be adjusted to the desired pressure on the object, depending on the texture and sensitivity of the material, by adjusting the tip 19 via the threaded coupling. The clamp 18 is released by simply pulling the handle 25 up and allowing the plunger 21 to travel parallel to the plate 16 away from the stop 14.

As may be appreciated in FIG. 8, when the lever (handle) 25 is utilized, the plunger 21 translates parallel to the plate 16 which corresponds to along the axial length of the rail 12. The translation causes the tip 19 to engage securely against the object that is trying to be located and holds the apparatus to the object by squeezing a side of the object between the stop 14 and the clamp 18.

Figure 9:
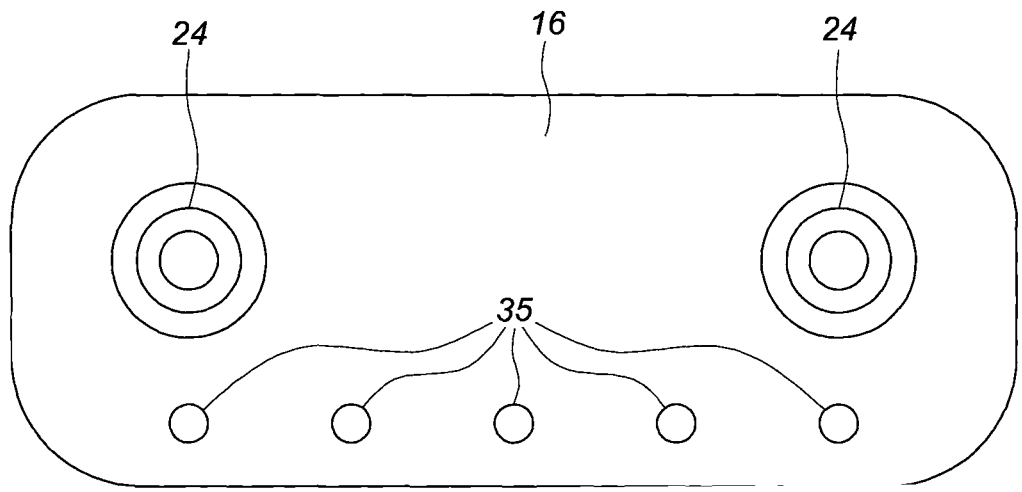
FIG. 9 illustrates a view of the plate 16 without the clamping mechanism attached.

FIG. 9 illustrates a view of the plate 16 without the clamping mechanism attached. As may be appreciated, the plate 16 can include a plurality of holes 35. The plurality of holes allow the clamping mechanism to be coupled to the plate in various different locations. While as part of typical use the clamping mechanism will not need adjusted with respect to the plate 16, the additional holes 35 allow for overall adjustment. In preferred embodiments, the holes 35 are predrilled threaded holes.

As may also be seen in FIG. 9, cap screws may be used as the fasteners 24 that attach the clamp 18 to the rail 12 in combination with the capture flange 17.

Figure 10:
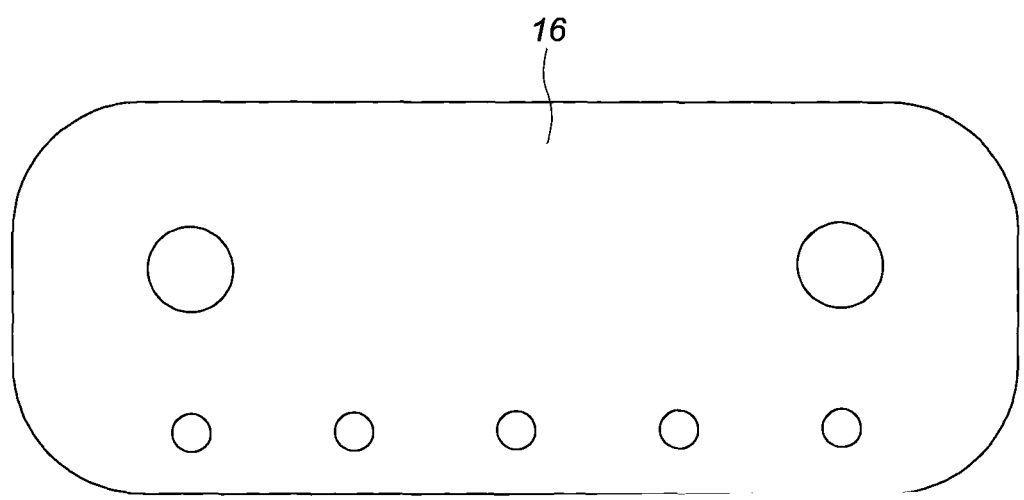
FIG. 10 illustrates the plate of FIG. 9 with nothing attached to the plate.

FIG. 10 illustrates the plate 16 of FIG. 9 with nothing attached to it.

Similar to the stops 14, the apparatus 10 includes a first and second clamp 18 each at opposite distal ends of the rail 12 with their tips pointing towards the middle and towards the respective stops 14.

As may be appreciated, the clamps 18 are used to secure the device 10 into the gap by squeezing a side wall or other portion of the cabinet or other object between the clamp 18 and the stop 14. As may be seen in FIG. 1, a stop 14 is on one side of the cabinet and the clamp 18 on the other. The clamp 18 applies pressure through the cabinet to the stop 14. This is repeated on the other side, opposite distal end, of the gap with an additional stop 14 and clamp 18 coupled to the same rail 12 on the opposite distal end, and thus the system is secured into the gap. Once attached on both sides and secured, the apparatus 10 will ensure the exact cap is maintained between the two objects.

In use, the components of the apparatus 10 may be coupled to the rail 12 and are preferably slidably coupled to the rail 12. In addition, other elements such as levels or other components may be coupled to the rail 12. The groove 15 allows both the stop 14 and clamp 18 to be securely positioned anywhere along the rail 12.

Motivating Challenge Addressed

As just one example of the device's use, the device may be used to maintain a fixed dimension of separation between two cabinets to accommodate an appliance such as a range or dishwasher. The precise opening needs to be maintained while leveling cabinets on both sides. In the process of leveling cabinets, the gap between the cabinets may often change. The apparatus described herein prevents a change in the dimensions of the gap and thus, allows easier installation of objects such as cabinets.

In the case of kitchen cabinet installation, the dimensions of the opening are determined by the width of the appliance which becomes the fixed dimension. Both cabinets on the left and right need to be maintained at a precise distance from one another and stay parallel in order to later accommodate the appliance. Once the cabinets are levelled attached to the wall, or other anchor point, the device can be removed.

Some Example Use Cases

Though there are many possible uses for this device, following are two simple use cases.

Use Case 1

A cabinet installer would use the device for appliance openings such as refrigerator, washer/dryer, dishwasher, range, microwave, or a hood vent. The Device/tool can be left engaged for any desired amount of time. The device would be removed once appliances are ready to be installed or removed after counter tops are installed.

In a preferred embodiment, the system would consist of 1 rail, two stops and two clamps. More than one system may be used at a time for a single gap and extra stops and clamps may be provided.

In operation, the installer would determine the size of the gap needed between two cabinets. The stops would be slid manually along the longitudinal length of the rail and secured in place on opposite distal ends at the exact spacing the installer wishes to maintain. One end of the device is then secured to a first cabinet by adjusting a first clamp along the longitudinal length of the rail to squeeze the cabinet wall between the first clamp and the stop. A second clamp is used on the opposite end to secure the device onto the second cabinet on the other side of the gap, thus maintaining the gap. In some embodiments, the steps are repeated with a second device.

Use Case 2

In addition, to cabinet installers, the device could be used for numerous other cases where a consistent gap needs to be maintained. For example, a welder could benefit from use of this device while welding a rectangle. Both material bodies must be held a fixed distance and parallel to each other. Once clamps and stops are positioned and engaged, this allows the welder to fabricate other sides. Once fabrication is complete, the device can be removed.

What is claimed is:

1. A method for maintaining a fixed distance between two cabinets during installation comprising:
adjusting a first stop along an axial length of an elongated rail;
fixing the first stop in a first position such that a first flat surface of the first stop is perpendicular to the axial length;
adjusting a second stop along the axial length of the elongated rail;
fixing the second stop in a second position such that a second flat surface of the second stop is perpendicular to the axial length and is parallel and facing an opposite direction from the first flat surface, wherein the first flat surface and the second flat surface are the fixed distance apart;
placing the elongated rail with the first stop and second stop between the two cabinets such that the first surface interfaces with a first cabinet of the two cabinets and the second flat surface interfaces with a second cabinet of the two cabinets;
adjusting a first clamp along the axial length of the elongated rail and fixing the first clamp in a third position adjacent the first stop such that a first wall of the first cabinet is between the first stop and the first clamp;
tightening the first clamp to squeeze the first wall between the first stop and the first clamp;
adjusting a second clamp along the axial length of the elongated rail and fixing the second clamp in a fourth position adjacent the second stop such that a second wall of the second cabinet is between the second stop and the second clamp;
tightening the second clamp to squeeze the second wall between the second stop and the second clamp;
fixing the first cabinet and second cabinet in place; and
loosening the first clamp and the second clamp and removing the elongated rail with the first stop, second stop, first clamp and second clamp from between the two cabinets.

2. The method of claim 1 wherein the elongated rail has a channel that runs along the axial length.

3. The method of claim 2, wherein a cross-section of the channel is dovetail shaped.

4. The method of claim 2, wherein the first stop, second stop, first clamp and second clamp are all fixed to the rail by tightening a fastener with a flange coupled to the fastener within the channel.

5. The method of claim 2, wherein the first stop and second stop each have ridges that extend into the channel.

6. The method of claim 5, wherein the first stop and second stop each have two ridges that extend into the channel on either side of a fastener.

7. The method of claim 1, wherein the first clamp and second clamp each have a tip that is designed to squeeze an object against a stop and is adjustable along an axial length of the first clamp and second clamp via a thread.

8. The method of claim 4 wherein the flange is a t-nut.

9. The method of claim 2, wherein the first clamp and second clamp each have two fasteners and two flanges that couple the first clamp and the second clamp to the elongated rail respectively.

10. The method of claim 1, wherein the elongated rail has preset positions along the axial length for the first stop and the second stop to allow the first stop and second stop to be positioned the fixed distance apart.

11. An apparatus for maintaining a fixed distance between two objects comprising:
an elongated rail with an axial length and a channel running along the axial length;
a first stop releasably coupled to the elongated rail such that the first stop is adjustable along the axial length of the elongated rail and fixable in various positions along the axial length of the elongated rail and wherein the first stop has a first flat surface that is perpendicular to the axial length when the first stop is in a first fixed position along the axial length of the elongated rail and the first stop has a first ridge that extends into the channel;

a second stop releasably coupled to the elongated rail such that the second stop is adjustable along the axial length of the elongated rail and fixable in various positions along the axial length of the elongated rail and wherein the second stop has a second flat surface that is perpendicular to the axial length and facing in an opposite direction from the first flat surface when the first stop is in a second fixed position along the axial length of the elongated rail and the second stop has a second ridge that extends into the channel;

a first clamp releasably coupled to the elongated rail such that the first clamp is adjustable along the axial length of the elongated rail and fixable in various positions along the axial length of the elongated rail and wherein the first clamp has a first tip designed to press an object against the first stop and wherein the first tip is adjustable along the axial length of the first clamp; and a second clamp releasably coupled to the elongated rail such that the second clamp is adjustable along the axial length of the elongated rail and fixable in various positions along the axial length of the elongated rail and wherein the second clamp has a second tip designed to press an object against the second stop and wherein the second tip is adjustable along the axial length of the second clamp.

12. The apparatus of claim 11, wherein the elongated rail has a channel that traverses the axial length of the elongated rail.

13. The method of claim 11, wherein the elongated rail has preset positions along the axial length for the first stop and the second stop to allow the first stop and second stop to be positioned the fixed distance apart.

* * * * *